United States Patent
Kreft et al.

(10) Patent No.: US 7,293,454 B2
(45) Date of Patent: Nov. 13, 2007

(54) ANTI-ALIASING ACOUSTIC FILTER IN THE PRESENCE OF PULSATING FLOW

(75) Inventors: Norbert Kreft, Meerbusch (DE); William Martin Silvis, Ann Arbor, MI (US)

(73) Assignee: AVL North America Inc., Plymouth, MI (US)

(*) Notice: Subject to any disclaimer, the term of this patent is extended or adjusted under 35 U.S.C. 154(b) by 0 days.

(21) Appl. No.: 11/009,546

(22) Filed: Dec. 10, 2004

(65) Prior Publication Data
US 2005/0145040 A1 Jul. 7, 2005

Related U.S. Application Data

(60) Provisional application No. 60/529,410, filed on Dec. 12, 2003.

(51) Int. Cl.
*G01M 19/00* (2006.01)
(52) U.S. Cl. .................. 73/118.1; 73/116; 73/117.2; 73/117.3

(58) Field of Classification Search .............. None
See application file for complete search history.

(56) References Cited

U.S. PATENT DOCUMENTS

| | | | | |
|---|---|---|---|---|
| 3,253,457 A | * | 5/1966 | Pakala et al. | 73/658 |
| 3,561,561 A | * | 2/1971 | Trainor | 181/267 |
| 4,596,133 A | * | 6/1986 | Smalling et al. | 73/24.01 |
| 4,749,058 A | * | 6/1988 | Trainor | 181/239 |
| 5,133,303 A | * | 7/1992 | Umehara | 123/41.15 |
| 5,167,152 A | * | 12/1992 | Shimizu et al. | 73/204.18 |
| 6,622,819 B2 | * | 9/2003 | Reynolds | 181/230 |
| 6,792,907 B1 | * | 9/2004 | Kostun et al. | 123/184.57 |
| 6,823,748 B2 | * | 11/2004 | Silvis et al. | 73/863.03 |
| 6,938,727 B2 | * | 9/2005 | Xia | 181/224 |
| 2002/0157482 A1 | * | 10/2002 | Silvis et al. | 73/864 |

* cited by examiner

*Primary Examiner*—Edward Lefkowitz
*Assistant Examiner*—Freddie Kirkland, III
(74) *Attorney, Agent, or Firm*—Carlson, Gaskey & Olds

(57) ABSTRACT

An exhaust flow measurement system uses a noise attenuation device to cancel exhaust gas pulsations at the harmonic frequency of a flow rate measurement transducer.

15 Claims, 3 Drawing Sheets

$f = \dfrac{1}{\tau} = \dfrac{1}{40\text{ms}} = 25\text{ Hz}$

ANTI-ALIASING ACOUSTIC FILTER IN THE PRESENCE OF PULSATING FLOW

This application claims priority to provisional application Ser. No. 60/529,410 filed on Dec. 12, 2003.

BACKGROUND OF THE INVENTION

This invention relates to a flow measurement correction for an exhaust flow measurement system.

A prior art exhaust flow measurement system 10 is shown in FIG. 1 with an exhaust F flowing through an exhaust flow tube 12. The system 10 includes a transducer 14 that measures the flow of exhaust F past the transducer 14 to calculate the flow rate, as is well known in the art. In the example shown, the transducer 14 includes first 16 and second 18 transducer portions that produce a signal that is sent to a signal processing unit 20 indicative of exhaust flow rate.

Inherent in the exhaust flow measurement system 10 are pulsations in the exhaust flow that undesirably change the rate of exhaust flow F past the transducer 14. A graph of flow rate versus time is shown in FIG. 2. The signal 22 is indicative of a flow rate having areas of noise 24, which results in undesirable inaccuracies in flow rate measurement that comprise the integrity of the test. While software is used to electronically filter much of the noise from the signal, significant inaccuracies still occur at the harmonics of the flow meter sampling frequency, also referred to aliasing.

A graph of a software-filtered signal 26 illustrated as amplitude versus frequency is shown in FIG. 3. As can be seen from the graph, the inaccuracies due to sampling rate 28 manifest themselves as large peaks at the harmonic frequencies that repeat at a particular frequency interval. The aliasing error manifests itself as the exhaust flow is read as a low frequency thereby "fooling" the software filter, which filters out higher frequencies. For the example shown, the sampling rate of the transducer is 40 milliseconds resulting in an aliasing error every odd multiple of 25 Hz, which is particularly problematic since the idle of some test engine are at or near the same frequency. Of course, a different sampling rate will produce an aliasing error at other frequencies, as can be appreciated by the equation accompanying FIG. 3.

Since the software filter is ineffective to eliminate inaccuracies due to aliasing, other means must be employed to eliminate the aliasing error.

SUMMARY OF THE INVENTION

This invention relates to an exhaust flow measurement device employing a correction for reducing or eliminating the aliasing error resulting from a pulsating exhaust flow. The system includes an exhaust flow tube carrying an exhaust flow, such as from a tail pipe of test vehicle. A transducer communicates with the exhaust flow tube and produces a signal indicative of an exhaust flow rate through the tube. An noise attenuation device is arranged upstream of the transducer to acoustically filter pulsations within the exhaust flow prior to reaching the transducer. Either passive or active noise attenuation devices may be employed.

The system corrects from the aliasing error by determining a sample rate of the transducer used in the system. The harmonic frequencies resulting from the sampling rate of the transducer is determined. An undesired frequency range of pulsations experienced during an engine test procedure is determined. The harmonic frequencies are attenuated by canceling the pulsations.

Accordingly, the present invention provides a system and method reducing or eliminating inaccuracies due to aliasing.

These and other features of the present invention can be best understood from the following specification and drawings, the following of which is a brief description.

DETAILED DESCRIPTION OF THE PREFERRED EMBODIMENT

Figure 1:
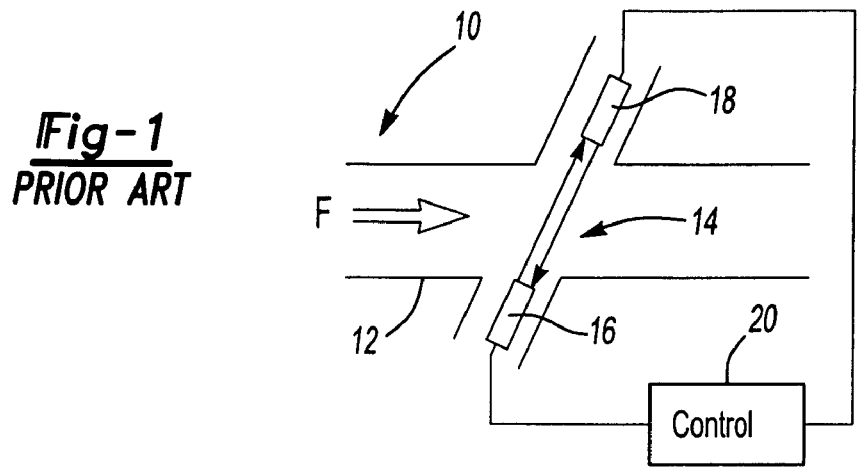
FIG. 1 is a schematic view of a prior art exhaust flow measurement system using ultrasonic flow meters.
Figure 2:
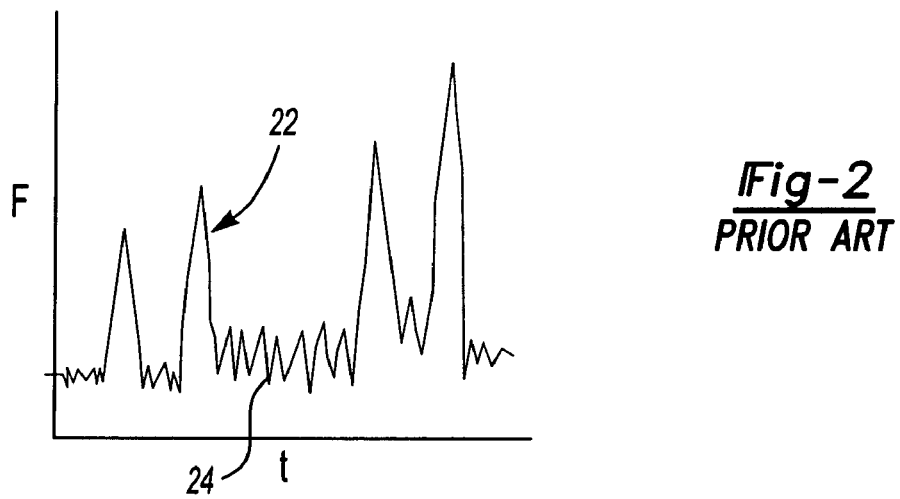
FIG. 2 is a graph of flow rate versus time of the system shown in FIG. 1.

One typical exhaust flow measurement system 10 is shown in FIG. 1. The system of FIG. 1 is intended to be highly schematic and only exemplary in nature. The exhaust flow tube 12 receives an exhaust flow F from an exhaust source such a test vehicle. The flow F includes pulsations that are typically present throughout an engine test procedure to varying degrees at particular frequencies. The pulsations may be more severe at lower frequencies, such as during engine idle. Based upon the sampling rate of the transducer 14, errors from pulsation may be missed by the software filter.

Specifically, for the example system 10, the first transducer portion 16 may be a piezoelectric transducer that receives an excitation signal from the signal processing unit 20 producing an ultrasonic wave directed at the second transducer portion 18. The second transducer portion 18 is excited by the ultrasonic wave from the first transducer portion 16 and produces an ultrasonic wave that is reflected back to first transducer portion 16. The excitation of the transducer portions 16 and 18 generates an electrical signal that is read by the signal processing unit 20. The signal processing unit 20 processes the signals and translates this information into fluid velocity. It should be understood, however, that other types of transducers may be used. Operation of the above transducer in an exhaust flow measurement system is well known in the art.

The present invention uses noise attenuation devices as an anti-aliasing feature to mechanically reduce or eliminate noise at desired harmonic frequencies caused by the transducer sampling rate.

Figure 3:
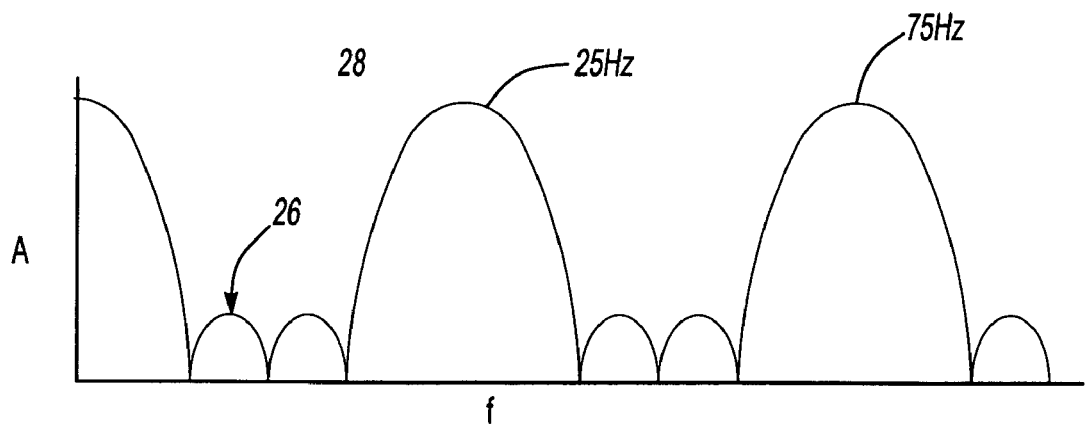
FIG. 3 is a graph of amplitude versus frequency of the signal shown in FIG. 2 after software filtering depicting an aliasing error.
Figure 4:
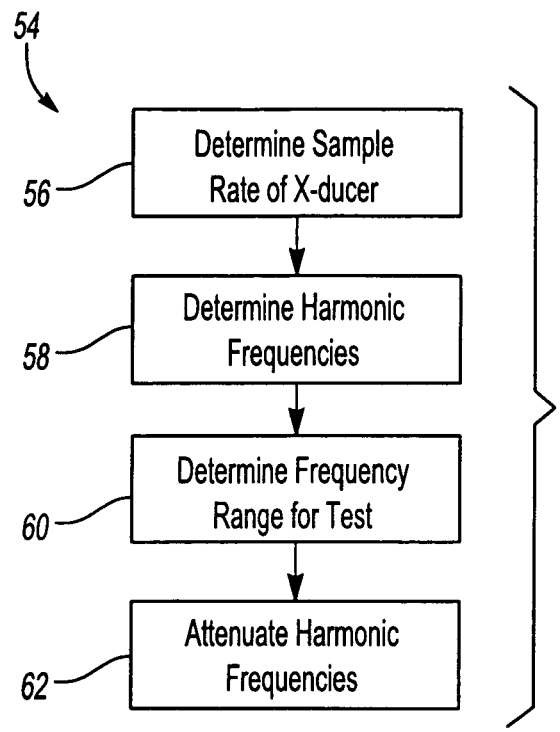
FIG. 4 is a flow chart of an example of the inventive method for filtering harmonic frequencies that produce the aliasing error.

FIG. 4 illustrates a very schematic flow chart of the present invention method. The method 54 includes the step of determining the sample rate of the transducer, as indicated at block 56. The sample rate determines the harmonic frequency as indicated by the equation associated with FIG. 3. This harmonic frequency is determined at block 58, for example, by using the period τ. The harmonic frequency may present problems for only few of the frequencies during the test. That is, the characteristics of the test engine may only fall within one or two of the harmonic frequencies. The desired frequency range to be eliminated, which is determined by the test engine's operating characteristics, is determined at block 60. In one example, an engine idles around 25 Hz, and a transducers harmonic frequency may be at 25 Hz based upon a 40 ms sample rate. To this end, it is desirable to attenuate the harmonic frequency at 25 Hz, as indicated at block 62.

Figure 5:
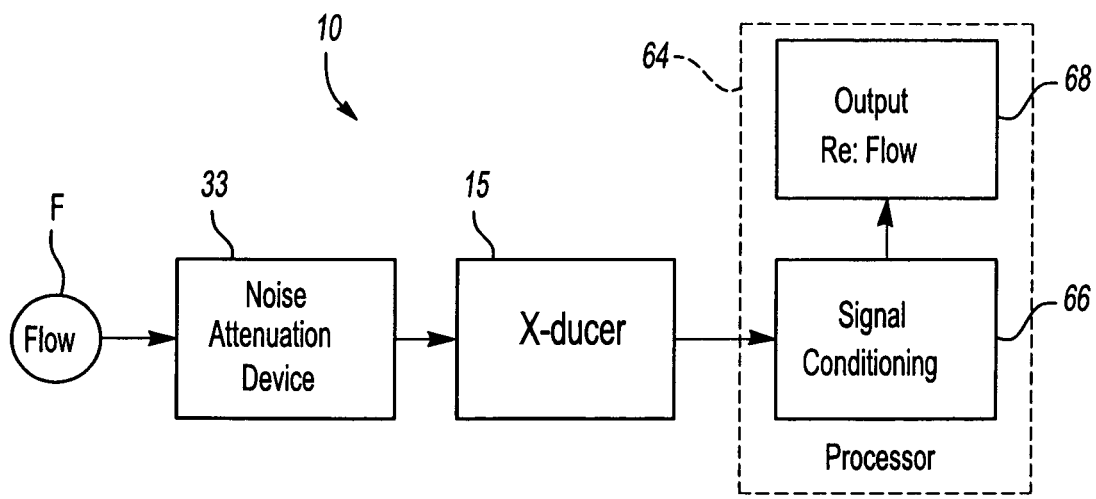
FIG. 5 is a schematic view of an example of the inventive exhaust flow measurement system with harmonic frequency filtering.

FIG. 5 schematically depicts an inventive exhaust flow measurement system 10. The flow F contains pulsations from the test engine that communicates with a noise attenuation device 33, preferably prior to reaching a transducer 15 that determines the flow rate of the flow F through the exhaust flow conduit. In the example shown in FIG. 5, the signal from the transducer 15 is conditioned by a signal conditioning device 66, which may be hardware or software, that is associated with a computer processor 64. The computer processor 64 may be one or more components and a combination of hardware and software. The conditioned signal more accurately represents output relating to flow, as indicated at 68, since the aliasing error has been removed.

The computer processor 64 may have values stored or input relating to the test engine's characteristics and the transducer sample rate. This information may be used to automatically control an active noise attenuation device and provide increased system flexibility.

Figure 6:
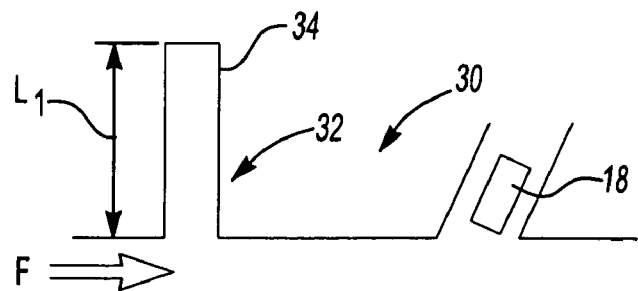
FIG. 6 is a schematic view of the inventive exhaust flow measurement system having quarter wave tubes providing an anti-aliasing feature.

Referring to FIGS. 6-9, several example attenuation devices 32 are shown. All these devices have very low flow restriction, which is desirable for measuring the exhaust flow accurately. Referring more specifically to FIG. 6, a first quarter wave tube 34 is arranged along the exhaust flow tube 12 to attenuate noise at 25 Hz for the example shown. A second quarter wave tube 35 attenuates noise at 75 Hz. The quarter wave tubes 34 and 35 have lengths L1 and L2 that provide the attenuation at the desired frequencies.

Figure 7:
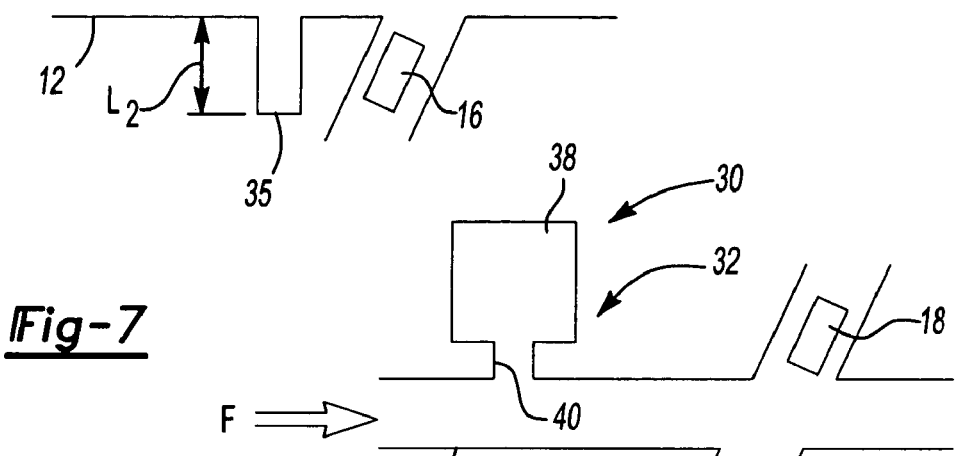
FIG. 7 is a schematic view of the inventive exhaust flow measurement system having a Helmholtz resonator providing an anti-aliasing feature.

Referring to FIG. 7, a Helmholtz resonator 36 is shown. A Helmholtz resonator 36 attenuates noise at a particular frequency by providing a cavity 38 and opening 40 of a particular size that is effective to attenuate noise at a desired frequency.

Figure 8:
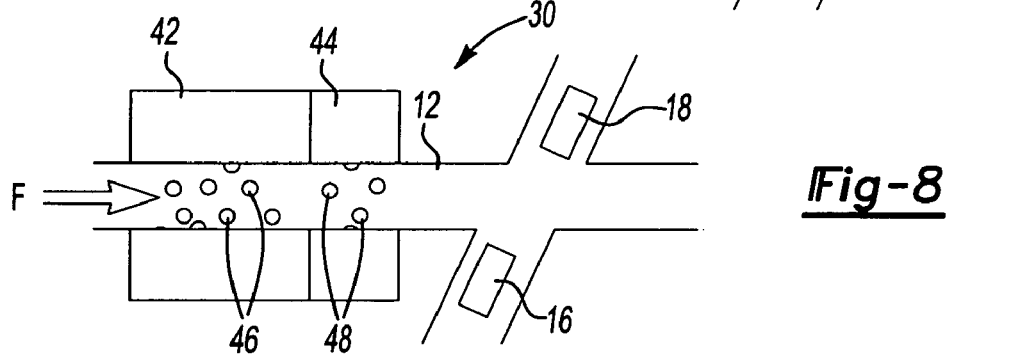
FIG. 8 is a schematic view of the inventive exhaust flow measurement system having perforated cavities providing an anti-aliasing feature.

Another example attenuation device 32 is shown in FIG. 8. The first 42 and second 44 cavities are arranged along a length of the exhaust flow tube 12. First 46 and second 48 perforations respectively fluidly connect first 42 and second 44 cavities. The first cavity 42 attenuates noise at 25 Hz for the example shown, and the second cavity 44 attenuates noise at 75 Hz.

Figure 9:
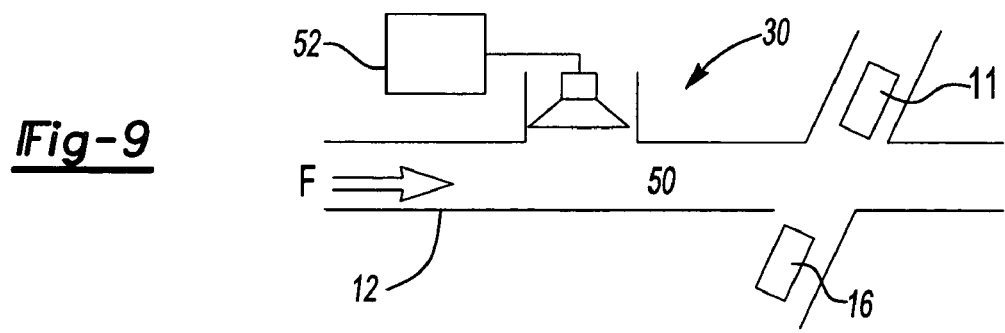
FIG. 9 is a schematic view of the inventive exhaust flow measurement system having a loudspeaker providing an anti-aliasing feature.

FIGS. 6-8 illustrate passive noise attenuation devices. FIG. 9 uses an active noise attenuation device that is in fluid communication with the exhaust flow tube 12. More particularly, the attenuation device 32 includes a loudspeaker 50 connected to an amplifier and other control devices 52 that drive the speaker 50 to produce noise canceling waves at the desired noise attenuation frequencies.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. An exhaust flow measurement system comprising:
   an exhaust flow tube carrying an exhaust flow;
   a transducer producing a signal indicative of an exhaust flow rate through said tube;
   a noise attenuation device upstream of said transducer acoustically filtering pulsations within said exhaust flow prior to reaching said transducer, wherein the noise attenuation device is a speaker; and
   a processor including information relating to a sample rate of the transducer and a frequency range of the pulsations desirous of being eliminated for a test procedure that relates to the sampling rate.

2. The system according to claim 1, wherein the transducer is an ultrasonic transducer.

3. The system according to claim 1, wherein a signal conditioner receives the signal and filters a noise from the signal.

4. The system according to claim 3, wherein the signal conditioner is hardware.

5. The system according to claim 3, wherein the signal conditioner is software.

6. The system according to claim 1, wherein the signal corresponds to a measurement of exhaust flow rate through the tube, the exhaust flow rate being a quantity of exhaust over a period of time.

7. An exhaust flow measurement system comprising:
   an exhaust flow tube carrying an exhaust flow;
   a transducer producing a signal indicative of an exhaust flow rate through said tube;
   a noise attenuation device upstream of said transducer acoustically filtering pulsations within said exhaust flow prior to reaching said transducer, wherein the noise attenuation device includes a cavity fluidly connected to the exhaust flow tube by multiple perforations.

8. The system according to claim 7, wherein the transducer includes a sample rate, and the noise attenuation device filters the pulsations at the sample rate.

9. The system according to claim 8, wherein the noise attenuation device filters the pulsations at multiples of the sample rate.

10. A method of providing an exhaust flow measurement comprising the steps of:
    a) determining a sample rate of a transducer;
    b) determining a harmonic frequency resulting from the sample rate;
    c) determining a frequency range of pulsations experienced from engine exhaust during an engine test procedure of which it is desirous to eliminate; and
    d) attenuating the pulsations at an undesired harmonic frequency based upon the harmonic frequency and the frequency range.

11. A method according claim 10, wherein step a) includes providing an ultrasonic transducer.

12. The method according to claim 10, wherein step b) includes calculating the harmonic frequency from the sample rate.

13. The method according to claim 10, wherein the frequency range is indicative of a test engine characteristic used in the engine test procedure.

14. The method according to claim 10, wherein a noise attenuation device is arranged in fluid communication with an exhaust flow tube.

15. The method according to claim 14, wherein a noise attenuation device includes a speaker.

* * * * *